(12) United States Patent
Tjerrild

(10) Patent No.: US 10,746,216 B2
(45) Date of Patent: Aug. 18, 2020

(54) WALL MOUNTING ASSEMBLY

(71) Applicant: Food Grade Solutions, LLC, Fowler, CA (US)

(72) Inventor: James Tjerrild, Clovis, CA (US)

(73) Assignee: FOOD GRADE SOLUTIONS, LLC, Fowler, CA (US)

( * ) Notice: Subject to any disclaimer, the term of this patent is extended or adjusted under 35 U.S.C. 154(b) by 92 days.

(21) Appl. No.: 15/941,355

(22) Filed: Mar. 30, 2018

(65) Prior Publication Data

US 2019/0301505 A1    Oct. 3, 2019

(51) Int. Cl.
| | | |
|---|---|---|
| *F16B 13/00* | (2006.01) | |
| *F16L 3/00* | (2006.01) | |
| *E04F 13/08* | (2006.01) | |
| *F16B 13/14* | (2006.01) | |
| *F16M 13/02* | (2006.01) | |
| *F16B 13/08* | (2006.01) | |

(52) U.S. Cl.
CPC ........ *F16B 13/003* (2013.01); *F16B 13/0858* (2013.01); *E04F 13/0866* (2013.01); *F16B 13/14* (2013.01); *F16B 2013/009* (2013.01); *F16L 3/00* (2013.01); *F16M 13/02* (2013.01)

(58) Field of Classification Search
CPC .... E04F 13/0866; F16B 13/003; F16B 13/14; F16B 2013/009; F16B 13/00; F16B 13/036; F16B 13/04; F16B 13/045; F16B 13/0858; F16B 13/0841; F16B 13/063; F16M 13/02

USPC ... 411/178, 18, 16, 24–25, 29–30, 176, 325, 411/271, 57.1

See application file for complete search history.

(56) References Cited

U.S. PATENT DOCUMENTS

| | | | | |
|---|---|---|---|---|
| 784,845 | A | * | 3/1905 | Evans ................ F16B 13/0858 411/54 |
| 1,705,086 | A | | 5/1929 | Ferguson |
| 1,835,243 | A | * | 12/1931 | Adolf ..................... B62D 21/09 403/410 |
| 2,150,080 | A | * | 3/1939 | Rawlings ................ F16B 13/12 411/37 |
| 3,662,644 | A | * | 5/1972 | Flesch ................ E04F 13/0837 411/32 |
| 3,711,138 | A | | 1/1973 | Davis |

(Continued)

*Primary Examiner* — Ingrid M Weinhold
(74) *Attorney, Agent, or Firm* — Neal, Gerber & Eisenberg LLP; Bradley Rademaker; Nawshaba Siddiquee

(57) ABSTRACT

A mounting assembly is provided for securing an element to a wall structure having a laminate outer cover residing adjacent to an internal thickness of compressible material. The assembly includes an anchor for engaging the wall structure and comprising a threaded outer wall for securing the anchor within the wall thickness, an elongated internal passageway for receiving an extent of an elongated fastener, and a deformable upper crown arranged about an open end of the passageway; a strut assembly coupled to the supported element; and an elongated fastener for securing the strut assembly to the anchor and wall structure. Other embodiments include a fastener assembly kit comprising a plurality of separate components to be assembled together to mount a strut member to a laminated foam wall panel, the components including an anchor, a washer assembly, a spacer, and an elongated fastener for securing the components to the wall panel.

27 Claims, 8 Drawing Sheets

(56) References Cited

U.S. PATENT DOCUMENTS

| | | | | |
|---|---|---|---|---|
| 4,856,951 | A * | 8/1989 | Blucher | E04D 3/3603 411/178 |
| D313,344 | S | 1/1991 | Tritle | |
| 5,339,593 | A | 8/1994 | Ludwig et al. | |
| 5,573,548 | A | 11/1996 | Nazre et al. | |
| D381,892 | S | 8/1997 | Porter et al. | |
| 5,682,678 | A * | 11/1997 | Gallagher | F16B 5/01 29/402.15 |
| 5,692,864 | A * | 12/1997 | Powell | F16B 13/002 411/30 |
| D398,363 | S | 9/1998 | LoBue | |
| 5,964,783 | A | 10/1999 | Grafton et al. | |
| 5,980,174 | A * | 11/1999 | Gallagher | F16B 5/01 29/897.32 |
| 6,361,258 | B1 * | 3/2002 | Heesch | F16B 23/0084 411/178 |
| 6,635,058 | B2 | 10/2003 | Beyar et al. | |
| 6,679,661 | B2 * | 1/2004 | Huang | F16B 13/002 411/178 |
| 6,702,534 | B2 * | 3/2004 | Filipp | E05D 5/023 411/32 |
| 7,651,056 | B2 * | 1/2010 | Tjerrild | F16L 3/133 248/58 |
| 7,727,235 | B2 | 6/2010 | Contiliano et al. | |
| 7,926,766 | B2 * | 4/2011 | Tjerrild | F16L 3/227 248/317 |
| 7,931,242 | B2 * | 4/2011 | Tjerrild | F16L 3/227 248/317 |
| 7,934,895 | B2 * | 5/2011 | Ernst | F16B 13/002 411/29 |
| 7,985,040 | B2 * | 7/2011 | Cao | F16B 35/041 411/178 |
| 8,057,147 | B2 * | 11/2011 | Ernst | F16B 13/002 411/387.1 |
| 8,112,864 | B2 | 2/2012 | Vincent | |
| 8,448,910 | B2 * | 5/2013 | Ernst | A47G 25/0607 248/223.41 |
| 8,511,035 | B2 * | 8/2013 | Zimmer | F16B 13/144 411/32 |
| 8,740,527 | B2 * | 6/2014 | Cheng | F16B 13/061 411/29 |
| 8,832,920 | B2 * | 9/2014 | Goldberg | F16B 5/0275 248/201 |
| 8,925,172 | B2 * | 1/2015 | English | F16B 13/04 108/158.11 |
| 9,291,188 | B2 * | 3/2016 | English | F16B 35/005 |
| D816,469 | S | 5/2018 | Toomey | |
| 9,958,000 | B2 * | 5/2018 | Chang | F16B 43/001 |
| 2002/0173822 | A1 | 11/2002 | Justin et al. | |
| 2004/0208721 | A1 * | 10/2004 | Kuenzel | F16B 13/0833 411/340 |
| 2004/0253075 | A1 * | 12/2004 | Liebig | F16B 13/066 411/57.1 |
| 2006/0178246 | A1 * | 8/2006 | Tjerrild | F16L 3/133 482/24 |
| 2006/0186278 | A1 * | 8/2006 | Tjerrild | F16L 3/133 248/65 |
| 2008/0124188 | A1 | 5/2008 | Chang et al. | |
| 2009/0022564 | A1 * | 1/2009 | Summerfield | F16B 13/0858 411/45 |
| 2009/0090820 | A1 * | 4/2009 | Tjerrild | F16L 3/133 248/58 |
| 2010/0084519 | A1 * | 4/2010 | Tjerrild | F16L 3/133 248/71 |
| 2011/0117355 | A1 | 5/2011 | Selle | |
| 2011/0163208 | A1 * | 7/2011 | Tjerrild | F16L 3/133 248/65 |
| 2012/0183371 | A1 | 7/2012 | Druschel et al. | |
| 2013/0269170 | A1 * | 10/2013 | Goldberg | F16B 5/0275 29/525.02 |
| 2014/0017026 | A1 * | 1/2014 | Cheng | F16B 13/003 411/108 |
| 2015/0023760 | A1 * | 1/2015 | Bove, III | F16B 13/002 411/383 |
| 2015/0117979 | A1 | 4/2015 | Anderson | |
| 2015/0176624 | A1 | 6/2015 | Bosco | |
| 2015/0313659 | A1 | 11/2015 | Miyawaki et al. | |

* cited by examiner

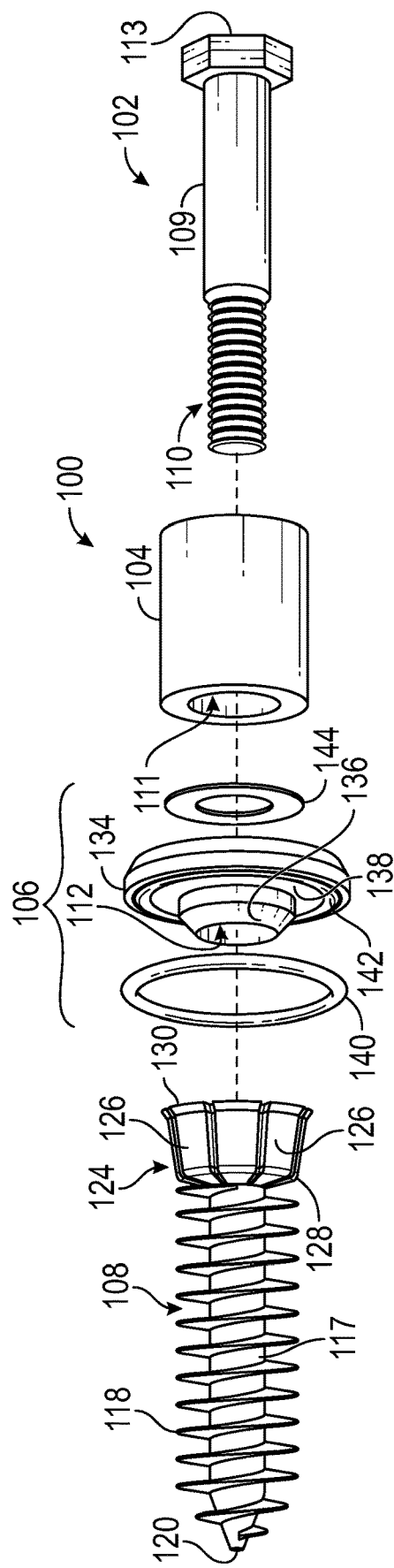
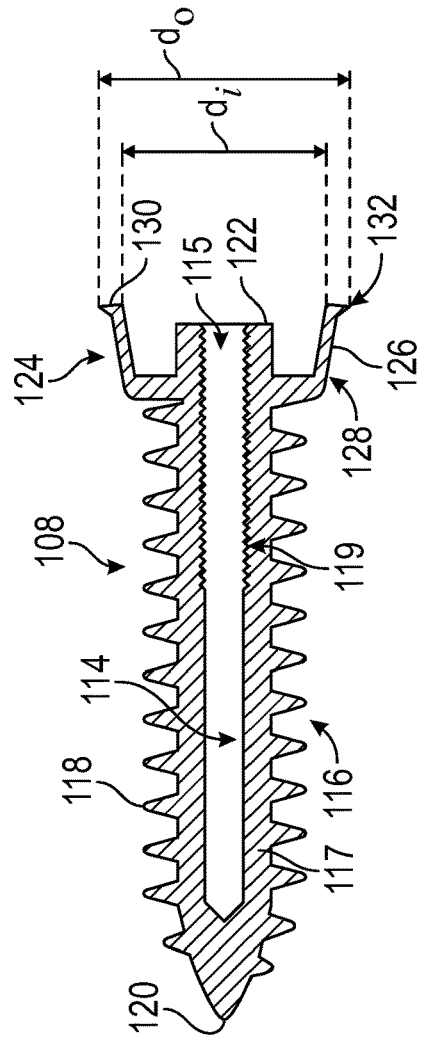
FIG. 1
FIG. 2

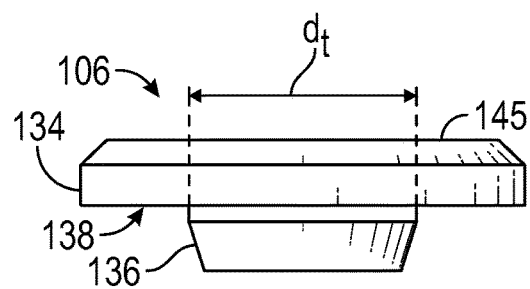
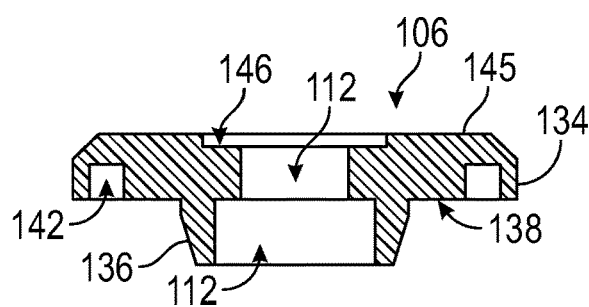
FIG. 7    FIG. 8
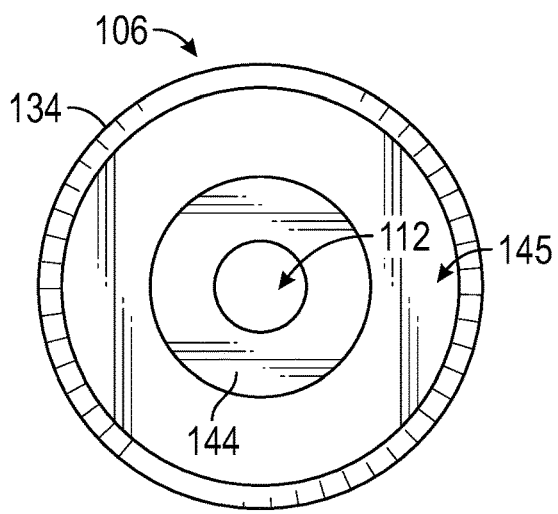
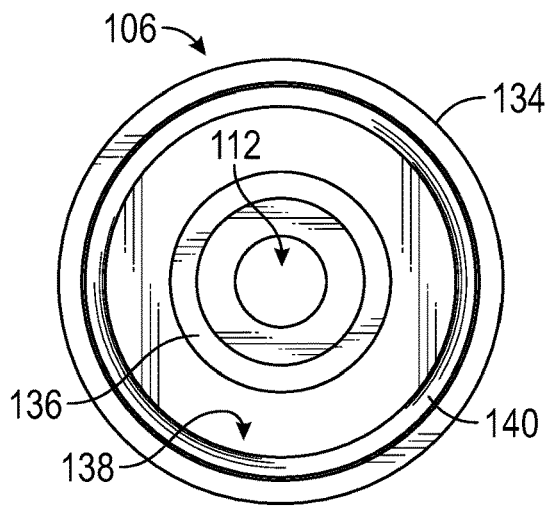
FIG. 9    FIG. 10
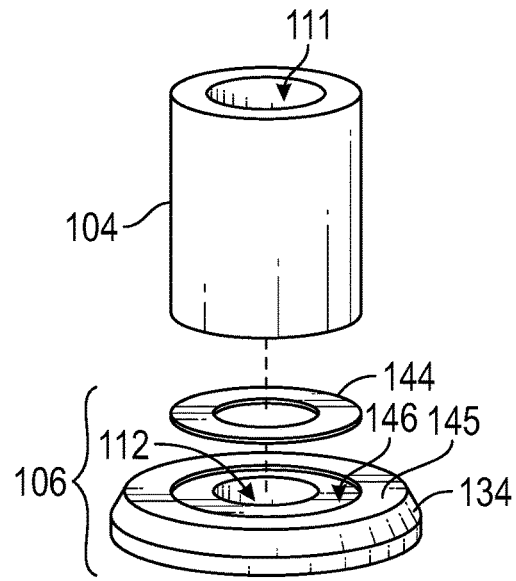
FIG. 11

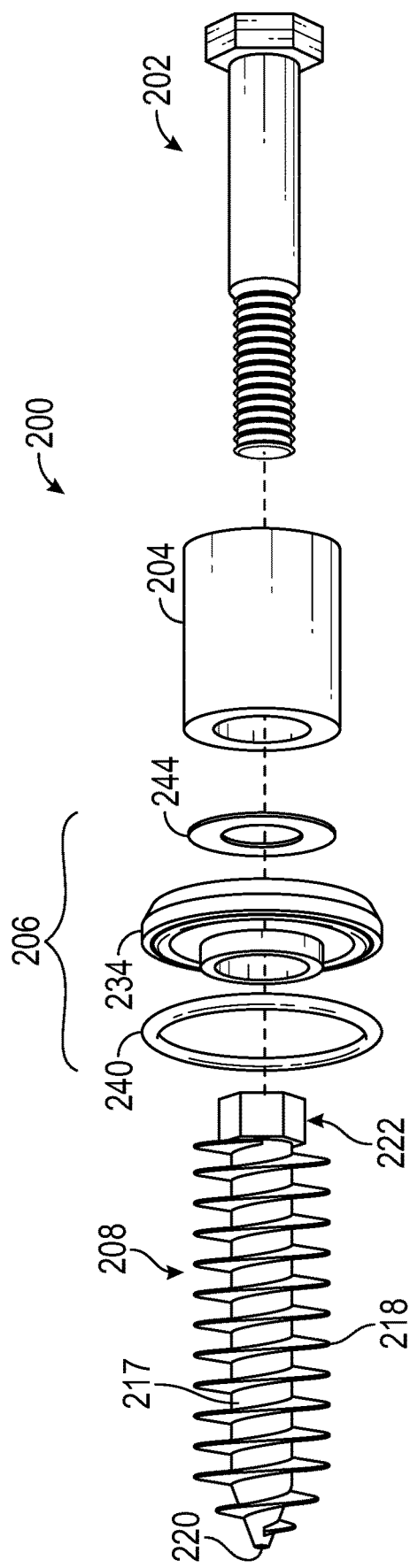
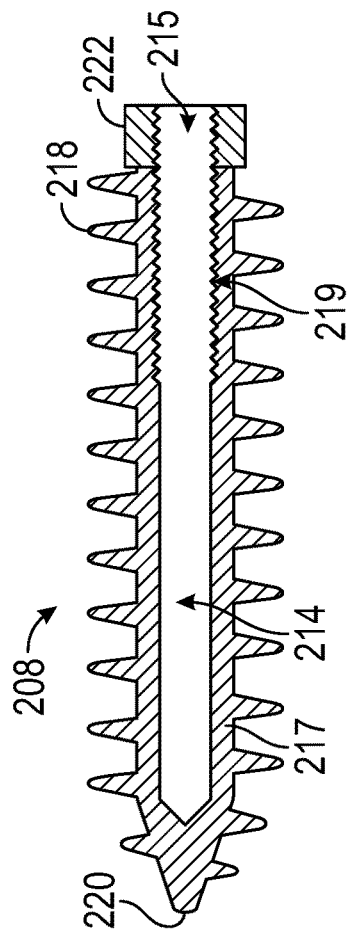
FIG. 12
FIG. 13

WALL MOUNTING ASSEMBLY

BACKGROUND

The description that follows relates to a wall mounting assembly for securing an object to a wall or other support structure. More specifically, the description relates to a wall mounting assembly intended to be used in food processing, pharmaceutical processing, and other facilities that require a high degree of cleanliness or enhanced sanitation.

Food processing and pharmaceutical processing facilities typically use conventional mounting systems to install pipes, conduit, and tubes. These conventional mounting systems are difficult to inspect and clean and tend to be prone to contamination, thus rendering them inherently dirty and possibly leading to food and drug safety issues. For example, conventional mounting systems may be used to mount pipes, conduits, and tubes to vertical and horizontal surfaces (e.g., walls). As will be appreciated, upward facing surfaces are especially at risk for collecting contaminants, falling debris, and water from wash downs. While the food and pharmaceutical processing facilities may be designed with enhanced sanitation in mind, the conventional mounting systems themselves can include horizontal surfaces or upward facing channels that are prone to contamination such as by collecting dust and debris on surfaces. Also, any unused slots or holes within the mounting system provide areas in which dirt, debris, and other contaminants can collect.

Further, any surface that cannot be easily inspected or cleaned can be susceptible to harboring filth and mildew and allow for collection of hazardous dust from food preparation or manufacturing process. For example, some conventional mounting systems are typically mounted directly onto the wall and the systems are designed such that small gaps exist between the mounting system and the wall, and these gaps are not easily accessible for inspection or cleaning. As another example, some conventional mounting systems include exposed threaded surfaces that are difficult to clean and tend to collect debris. Some mounting systems may require disassembly in order to achieve an adequate level of cleaning.

Moreover, most conventional mounting systems cannot be securely fastened to laminated foam wall panels, as are commonly used in the wall structures of food and pharmaceutical processing facilities. For example, the insulated wall panel products sold by Kingspan®, such as the Mineral Fiber (MF) Fire Rated wall panel system, have a compressible interior made of foam and a hard exterior or cladding made of metal (e.g., aluminum, stainless steel, etc.) or the like. The wall mounting screws found in many conventional mounting systems are not ideal for gripping the foam interior of such wall panels and staying in place for mounting a load, such as a conduit or pipe or the like, and do not provide a suitable mounting assembly for food preparation areas to prevent collection of dust or allow for cleaning of the mounting assembly.

Accordingly, there is still a need in the art for wall mounting assemblies that are suitable for locations requiring a high degree of cleanliness, can resist contamination, and are easy to inspect and clean.

SUMMARY OF THE INVENTION

The invention is intended to solve the above-noted problems by providing, among other things, a wall mounting assembly capable of securing a supported element, such as pipes, conduit, or tubes, to a wall or other support structure, while providing enhanced sanitation suitable for food grade and pharmaceutical grade installations. For example, the wall mount assembly is configured to resist contamination and is easy to clean and inspect.

The invention is particularly advantageous for use with a wall structure in a food processing facility or manufacturing area that includes laminated foam panels, as is commonly used, including wall panel products such as Kingspan® Insulated Panels. The invention provides an assembly and method of securing a mounting bracket to the wall structure which was previously unavailable.

A better understanding of the invention will be obtained from the following detailed descriptions and accompanying drawings, which set forth illustrative embodiments that are indicative of the various ways in which the principals of the invention may be employed.

BRIEF DESCRIPTION OF THE DRAWINGS

FIG. 1 is an exploded perspective view of an exemplary fastener assembly, in accordance with certain embodiments;

FIG. 2 is a cross-sectional side view of an exemplary wall anchor included in the fastener assembly of FIG. 1, in accordance with certain embodiments;

FIG. 7 is a side view of an exemplary washer assembly included in the fastener assembly of FIG. 1, in accordance with certain embodiments;

FIG. 8 is a cross-sectional side view of an exemplary washer included in the washer assembly of FIG. 7, in accordance with certain embodiments;

FIG. 9 is a top view of the washer assembly shown in FIG. 7, in accordance with certain embodiments;

FIG. 10 is bottom view of the washer assembly shown in FIG. 9, in accordance with certain embodiments;

FIG. 11 is an exploded perspective view of an exemplary spacer and the exemplary washer assembly included in the fastener assembly of FIG. 1, in accordance with certain embodiments;

FIG. 12 is a exploded perspective view of another exemplary fastener assembly, in accordance with certain embodiments;

FIG. 13 is a cross-sectional side view of an exemplary wall anchor included in the fastener assembly of FIG. 12, in accordance with certain embodiments.

Figure 3:
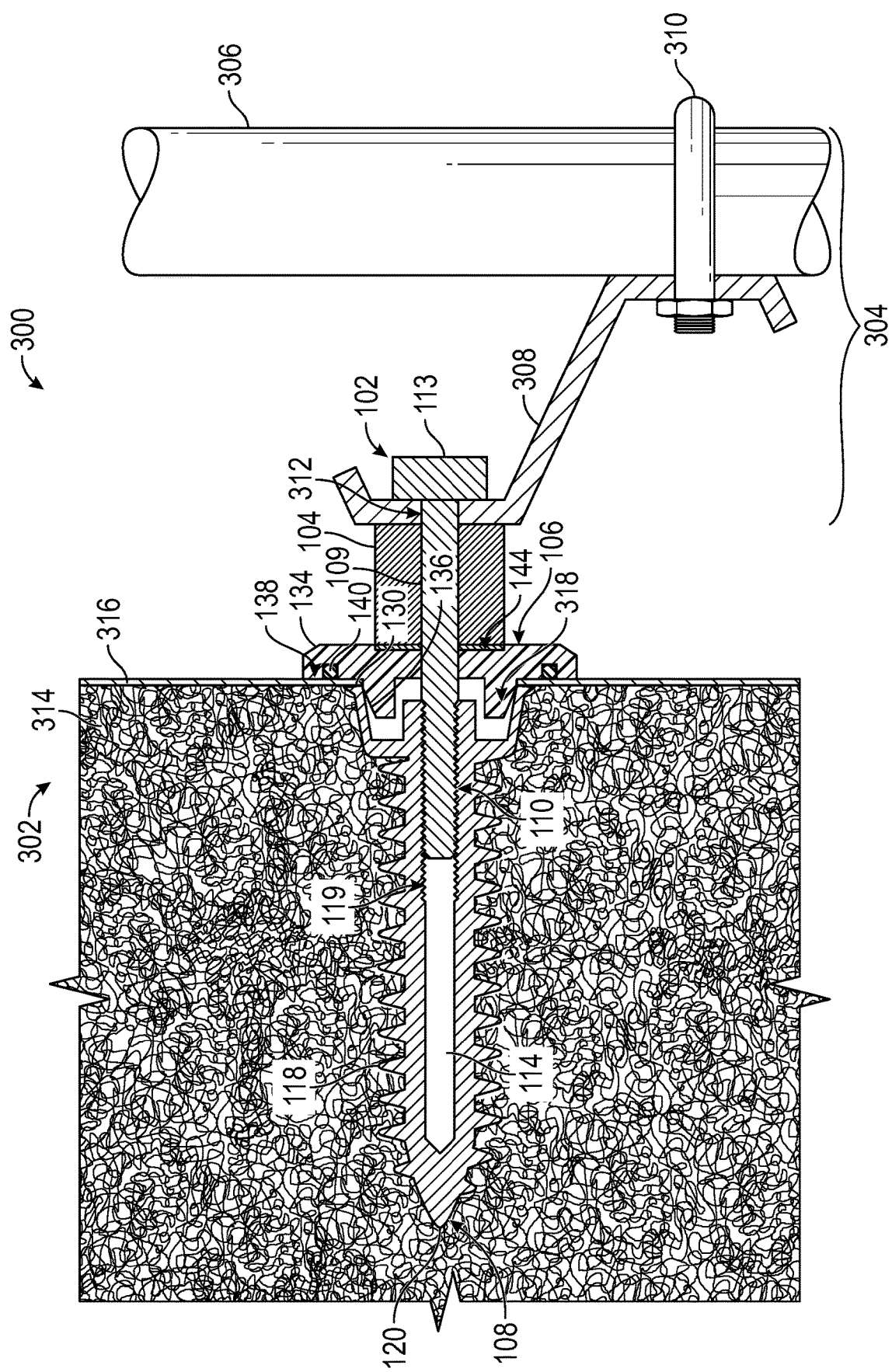
FIG. 3 is a cross-sectional side view of a wall mounting assembly attached to a wall panel, the wall mounting assembly including the fastener assembly of FIG. 1 and an exemplary mounting bracket or strut assembly, in accordance with certain embodiments.

Illustrative and exemplary embodiments of the invention are described in further detail below with reference to and in conjunction with the figures.

DETAILED DESCRIPTION

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 is an exploded view of an exemplary fastener assembly 100 configured for mounting a supported element to an upright support, in accordance with embodiments. For example, as shown in FIG. 3, the fastener assembly 100 can be used to mount a strut member or other wall hanger comprising a surface for attachment to a pipe, conduit, or tube, to a wall or other vertical or generally vertical surface. In some cases, the fastener assembly 100 may be used to mount a strut member to a horizontal surface, such as a ceiling. In some embodiments, the fastener assembly 100 may be provided as a kit for mounting the assembly 100 to a wall and said kit may further include one or more tools configured to facilitate said installation, such as, for example, a driver (e.g., drill bit, ratchet, etc.) or other suitable tool. In an embodiment of the kit according to the present invention, each of the components described herein may be provided together, optionally in a package containing the collection of parts for a full assembly of the device or optionally in a collection of parts for multiple assemblies. The kit may include the parts for one or more assemblies, with tools used for installation and practice of the method described herein—such as a driver tool for inserting the anchor (such as a driver tool that may be attached to a power drill or ratchet—and may include a drill bit configured for boring a hole in the panel or laminate of the panel with suitable dimension and depth for inserting the anchor into the panel material and thereby securing the anchor within the panel.

As shown in FIG. 1, the fastener assembly 100 comprises a plurality of separate components that are configured (e.g., sized and shaped) to be assembled together to mount a strut member or other element to a wall or wall panel. The separate components include an elongated fastener 102, a spacer 104, a washer assembly 106, and an anchor 108. According to embodiments, the anchor 108 is configured to engage the wall panel, or be inserted into the wall panel. The washer assembly 106 is configured for coupling to both the anchor 108 and the wall panel. The spacer 104 is configured for attachment to the washer assembly 106, opposite the wall panel, and to the strut member. Optionally, the washer assembly may comprise an integral spacer body, thus optionally providing an assembly which need not include a separate spacer 104. The elongated fastener 102 is configured for securing all of the separate components together and to the wall panel. As shown in FIG. 3, a portion of the fastener assembly 100, including the spacer 104 and a portion of the washer assembly 106, is configured to remain exposed or protrude out from the wall panel after securing the fastener assembly 100 to the wall, and a remaining portion of the fastener assembly 100, including the anchor 108, is configured to extend into and attach to the internal thickness 314 of the wall panel 302.

In embodiments, the fastener assembly 100 is especially designed for use in locations that require a high degree of cleanliness, such as food processing plants and pharmaceutical manufacturing installations. For example, one or more components of the fastener assembly 100, such as, e.g., the anchor 108, can be specifically configured for secure fastening to a laminate foam wall panel typically used in food processing plants and other industrial-level, clean environments (e.g., as shown in FIG. 3). Such wall panels include a compressible, foam (or Styrofoam) interior which is difficult to grip with a conventional metal screw. Also, an extent of the fastener assembly 100 that remains exposed after installation can be configured to be generally without a horizontal surface, and thereby avoid collection of dust. As will be appreciated, exposed horizontal surfaces, such as those found in conventional wall mounting assemblies, can harbor contaminants including filth and mildew, as they tend to collect dust and debris along with water from wash downs.

In some embodiments, the areas of the fastener assembly 100 that remain exposed after installation are further configured to repel contaminants and to be easy to inspect and clean. For example, one or more of the exposed surfaces, such as, e.g., fastener 102 and/or spacer 104, may be made with stainless steel and polished to a #4 sanitary finish, or the like. As another example, the washer assembly 106 can be configured to create a tight seal with the wall panel, so as to prevent the formation of small gaps between the wall and the fastener assembly 100, as will be described in more detail below. It should be appreciated that small gaps or crevices, such as those found in conventional mounting assemblies, can be difficult to inspect and clean or allow water or cleaning solution to pass into the mounting area of the assembly and/or the opening in the wall panel that is needed for mounting. At the same time, the fastener assembly 100 is configured to hold the supported element (e.g., strut member) a predetermined distance away from the wall (see, e.g., FIG. 3), for example, using the spacer 104 (or upper spacer body of the washer assembly 106), with the predetermined distance being selected so that contaminants can easily fall downwards in the gap formed between the wall and the strut member. In conventional mounting assemblies, the strut member may be mounted so close to the wall that the gap formed therebetween is not easily inspectable or cleanable. Further, in conventional mounting assemblies, a gasket seal is not available for suitably sealing the external environment from the opening in the wall structure that is needed for mounting. In the present embodiment shown and described, the invention provides an enlarged diameter of a washer assembly 106 which includes a gasket (140, 240) to seal the surface engagement between the washer assembly 106 and the surface of the wall structure (e.g., panel 316, 416).

These and other advantages of the fastener assembly 100 will become apparent based on the disclosure provided herein.

Referring back to FIG. 1, the separate components of the fastener assembly 100 will now be described in more detail. The spacer 104 and the washer assembly 106 each have a generally annular body that is configured to receive an extent of the elongated fastener 102 there through, such as, for example, first portion 109 shown in FIG. 1. In an embodiment, the spacer 104 is formed as an upper extending body of the washer assembly 106, either as a unified assembly or one of disassembled parts. Another extent of the fastener 102, such as, for example, second portion 110 shown in FIG. 1, is securely received by the anchor 108 (e.g., as shown in FIG. 3). In embodiments, an overall length of the elongated fastener 102 is selected so that, upon assembly, the fastener 102 extends through an open center 111 of the spacer 104, through an open center 112 of the washer assembly 106, and into a central passageway 114 of the anchor 108, leaving only a drive head 113 of the fastener 102 exposed or visible. In embodiments, the elongated fastener 102 may be a commercially-available metal bolt or screw, such as, for example, a hex bolt, a cap screw, a lag bolt, a button head bolt, a pan head bolt, or any other suitable style or type of fastener. The exact size or dimensions (e.g., body length, head diameter, etc.) of the fastener 102 may be selected based on one or more dimensions of the spacer 104 and/or other components of the fastener assembly 100, and/or one or more dimensions of a supported element attached to the fastener assembly 100, such as, e.g., the strut member shown in FIG. 3. As an example, the head 113 of the elongated fastener 102 may be a hex head, and the fastener 102 may have a diameter of 8-32, 10-32, ¼ inch, 5/16 inch, ⅜ inch, ½ inch (or similar metric sizes), and the length of the fastener 102 may be 2 inches, 2.5 inches, 3 inches, etc. In one preferred embodiment such as is shown in the Figures, the elongated fastener 102 is a Type 304 Stainless Steel Hex Bolt, or Hex Head Cap Screw, with a ⅜ inch diameter a body length of at least 2 inches and right hand national coarse threads (e.g., 16TPI).

As shown in FIG. 1, the first portion 109 of the elongated fastener 102 can have a plain or smooth surface, like the inner surfaces of the spacer 104 and the washer assembly 106, so that the first portion 109 can easily pass through and reside within the hollow portion 111 of the spacer 104 and the open center 112 of the washer assembly 106. As shown in FIG. 1, the second portion 110 has a threaded surface. The smooth, inner surfaces of the spacer 104 and the washer assembly 106 also allow the second, or remaining, portion 110 of the fastener 102 to easily pass there through, on its way to the anchor 108.

In embodiments, a length of the first portion 109 can be selected based on, or set substantially equal to, a length of the spacer 104 and an overall length of the washer assembly 106. In such cases, the first portion 109 can be housed entirely or substantially within the spacer 104 and the washer assembly 106 upon assembly, thus preventing a surface area of the first portion 109 of the fastener 102 from being exposed after coupling the fastener assembly 100 to a wall (e.g., as shown in FIG. 3).

Referring additionally to FIG. 2, shown is a cross-sectional view of the anchor 108 in accordance with embodiments. As illustrated, the anchor 108 has an elongated body 116 comprised of an outer wall 117 and helical threads 118 extending radially outward along an extent of the outer wall 117. The anchor 108 further includes a hollow center, or central passageway 114, formed within and extending substantially through an extent of the elongated body 116. The central passageway 114 has an open end 115 and is configured to securely receive, via the open end 115, the second portion 110 (a threaded shaft portion) of the elongated fastener 102. For example, at least a portion of the central passageway 114 includes a threaded surface 119 configured to engage the threaded shaft 110 of the fastener 102. In a preferred embodiment, the threads of the threaded surface 119 may be sized and shaped to match or correspond to the threads of the second portion 110 of the fastener 102. A length of the second portion 110 of the fastener 102 can be selected so that, upon assembly, the second portion 110 is entirely or substantially housed within the central passageway 114 of the anchor 108. This prevents a surface area of the second portion 110 of the fastener 102 from being exposed after coupling the fastener assembly 100 to a wall (e.g., as shown in FIG. 3).

Referring additionally to FIG. 3, shown is a cross-sectional view of a wall mounting assembly 300 coupled to a wall or wall panel 302, in accordance with embodiments. The wall mounting assembly 300 includes the fastener assembly 100 shown in FIG. 1 and a strut assembly 304 coupled to a supported element 306. The supported element 306 can be a pipe, conduit, tube, or the like. The strut assembly 304 includes a strut 308, or strut member, coupled to the fastener assembly 100 on one end and to the supported element 306 on the other end. The strut assembly 304 also includes a fastener 310 for securing the strut 308 to the supported element 306. The fastener 310 can be a U-bolt or any other suitable device for attaching the supported element 306 to the strut 308.

In embodiments, the strut 308 includes a hole 312 for receiving the elongated fastener 102 of the fastener assembly 100. The hole 312 may be pre-drilled into the strut 308, or formed (e.g., punched, drilled, etc.) on site at the time of mounting the strut assembly 304 to the wall 302, and optionally may be a slot type hole to allow for adjustability during assembly. The hole 312 can be configured to be smaller than the drive head 115 of the fastener 102 and at least large enough to receive the first portion 110 of the fastener 102. In a preferred embodiment, the hole 312 is configured to have a diameter that is substantially equal to the diameter of the first portion 110, so as to eliminate or minimize open space between the hole 312 and the first portion 110 of the fastener 102.

As shown in FIG. 3, the strut 308 can be configured to angle the supported element 306 away from the wall 302, or at least substantially parallel to the wall 302. In embodiments, the strut 308 may be substantially similar to the strut shown and described in U.S. Pat. No. 7,651,056, filed on Oct. 12, 2005 and entitled "Method of Mounting Support Assemblies for Pipes, Conduits, and Tubes," which has the same inventor as the present disclosure and is incorporated by reference herein in its entirety.

In embodiments, the wall 302 can be comprised of a thick, inner portion 314 (also referred to herein as an "internal thickness") overlaid by a thin panel 316 (also referred to herein as a "laminate outer cover"), as shown in FIG. 3. The inner portion 314 may be constructed of thick foam or foam board, or other sturdy, compressible material capable of being penetrated by the anchor 108, but also capable of at least partially supporting a weight of the wall mounting assembly 300 and the supported element 306. The thin panel 316 may be a laminate cover or sheet metal cladding made of stainless steel or other material suitable for highly sanitary installations. The laminate cover 316 may be attached to the inner portion 314 using adhesive or other suitable technique. In some embodiments, the thickness of the inner portion 314 can be, for example, between 4 and 8 inches, while the thin cover 316 residing adjacent thereto can be significantly thinner (e.g., like a skin), as shown in FIG. 3. As an example, the wall 302 may be an insulated wall panel sold by Kingspan®, such as the Mineral Fiber (MF) Fire Rated wall panel.

According to embodiments, one or more components of the anchor 108 can be configured to facilitate installation and/or insertion of the anchor 108 into the wall panel 302. For example, a distal end 120 of the anchor 108 may have a generally conical or tapered shape with a pointed and/or sharp tip to help create or bore a path through the thick foam as the anchor 108 is inserted into the inner portion 314 of the wall 302 during installation (see, e.g., FIGS. 15 and 16).

In addition, the anchor 108 preferably includes an extent of its length with helical threading 118 or similar auger outer arrangement, wherein the helical threading 118 is configured to cut through the compressible (or frangible) wall material without wandering (e.g., so as to move in a steady, straight line) and/or tearing. For example, the helical threads 118 can be formed of wide walls with thin, sharp edges spiraling around the outer wall 117, the edges being configured to cut through the compressible material of the inner wall portion 314 without tearing. In addition, an overall height of the helical threads 118 at one or more locations along the outer wall 117 can be selected so the threads 118 have a progressive or tapered profile. For example, the progressive thread profile along an extent of the length of the anchor 108 may be formed by gradually narrowing an overall height of the threads 118 as the threads 118 near the distal end 120, as shown in FIGS. 1 and 2. In some embodiments, the overall profile of the anchor 108 progressively narrows starting from a proximate end adjacent to the bottom end 128 of the upper crown 124 and ending at the distal end 120. In either case, the progressive thread profile can be configured so that the threads 118 gradually and steadily increase the size of the hole being formed through the compressible material as the anchor 108 travels deeper and deeper into the inner wall portion 314. Increasing the hole size in such a controlled manner can help prevent undesirable tearing of the compressible material and can guide the anchor 108 in a substantially straight line, or otherwise prevent the anchor 108 from wandering during insertion.

Furthermore, the anchor 108 can have a length configured to enable an extent of the outer wall 117 to be forced into and through the compressible material of the inner portion 314. In one exemplary embodiment, the anchor 108 has an overall length of about 3 to 4 inches (e.g., approximately 3.4 inches). This length plus the use of a sturdy, lightweight material (e.g., a hard plastic) and a progressive thread profile enable the elongated body 116 to be inserted, or screwed, into the inner portion 314 of the wall 302 with a controlled amount of resistance and torque. Further, the anchor 108 can include a drive head 122 configured for user engagement when forcing or inserting the elongated body 116 of the anchor 108 into the wall panel 302. As shown in FIG. 2, the drive head 122 can be coupled to the elongated body 116 adjacent the open end 115. The drive head 122 includes an opening in communication with the central passageway 114 for receiving the elongated fastener 102 there through.

The anchor 108 can also be configured to anchor or secure the remaining components of the fastener assembly 100 (also referred to herein as a "mounting assembly") to the wall panel 302, upon installation of the fastener assembly 100. For example, the helical threads 118 on the outer wall 117 of the anchor 108 can be configured to securely engage the foam board within the wall panel 302 to support the weight of the mounting assembly and any supported element coupled thereto. In some embodiments, the helical threads 118 can include course threading configured to firmly grip the compressible material of the wall panel 302 upon installation. Further, the anchor 108 can be made of a lightweight rigid material (e.g., plastic) to provide rigid outer threads 118 while providing compressible inner passageway 114 material when engaged with the rigid (metal) fastener 102.

Figure 4:
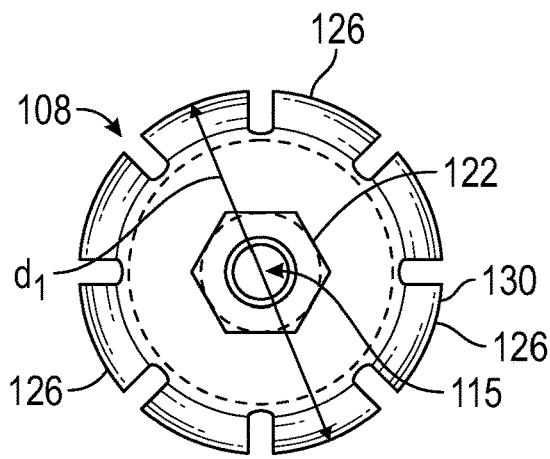
FIG. 4 is a top view of the wall anchor shown in FIG. 2, in a neutral position, in accordance with certain embodiments.

To further facilitate anchoring of the fastener assembly 100 to the wall panel 302, the anchor 108 includes an annular collar, or upper crown 124, arranged about the open end 115 of the central passageway 114 and the drive head 122. As also shown in FIG. 4, which is a top view of the anchor 108, the upper crown 124 comprises a plurality of circumferentially spaced elements 126 (e.g., fingers) that cooperate to form an outer crown diameter $d_o$ and give the crown 124 a generally castled shape. The crown elements 126 extend upwards from a base portion 128 of the crown 124. An extent of each crown element 126 also extends radially outward from a central axis of the base portion 128, so as to create an outwardly sloping wall around at least a portion of the crown 124. The extent of the crown elements 126 that slope or extend radially outwards can vary.

For example, in some embodiments, each crown element 126 ends at a substantially flat top rim 130 that is formed by a flange or protruding lip portion 132 extending radially outward from the rest of the element 126. In such cases, the outwardly sloping wall includes the sidewall that forms the protruding lip 132. In the exemplary embodiment of FIG. 2, the upwardly extending crown elements 126 also extend radially outwards, so that a longer portion of the crown wall (e.g., the entire length of the crown elements 126) forms the outwardly sloping wall. In another embodiment (for example, wall anchor 508 shown in FIGS. 15 and 16), the crown elements extend upward from, and generally perpendicular to, the base of the crown, so as to form a substantially straight crown wall. In such cases, only the protruding lip at the top rim of the crown elements forms the outwardly sloping crown wall. In yet another embodiment, the crown elements do not include the protruding lip, but an entire length of each crown element extends upwards and radially outwards from the base portion of the crown to form the outwardly sloping crown wall.

The following paragraphs will refer to the anchor 108 shown in FIGS. 1 and 2 to describe how the crown elements 124 move when a force is exerted on the crown 124. However, it should be appreciated that the same description/movement may apply to other embodiments of the wall anchor, such as, e.g., wall anchor 508 shown in FIGS. 15 and 16.

Referring back to FIG. 2, the top rim 130 has an inner diameter $d_i$ formed by the walls of the crown elements 126 and an outer diameter $d_o$ formed by the flange portion 132. In embodiments, the crown elements 126 are configured to move radially outward or radially inward in response to certain forces applied to the crown elements 126. These movements cause both the inner crown diameter $d_i$ and the outer crown diameter $d_o$ of the top rim 130 to be enlarged or reduced, respectively. For the sake of simplicity, the following examples will describe the change in the outer diameter $d_o$ of the top rim 130 during such movements. However, it will be appreciated that both diameters $d_o$ and $d_i$ may simultaneously change during these movements.

Figure 5:
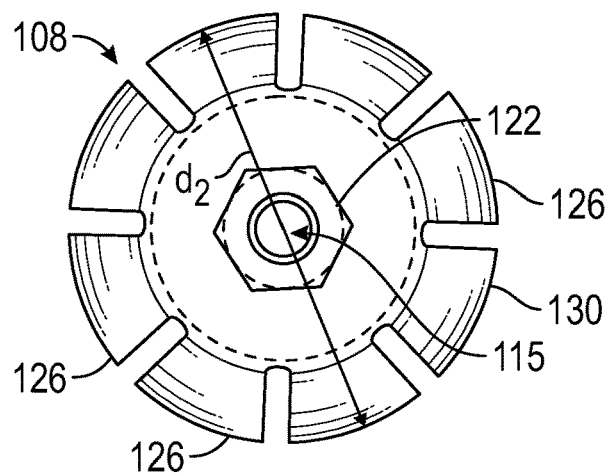
FIG. 5 is a top view of the wall anchor shown in FIG. 4, in an expanded position, in accordance with certain embodiments.
Figure 6:
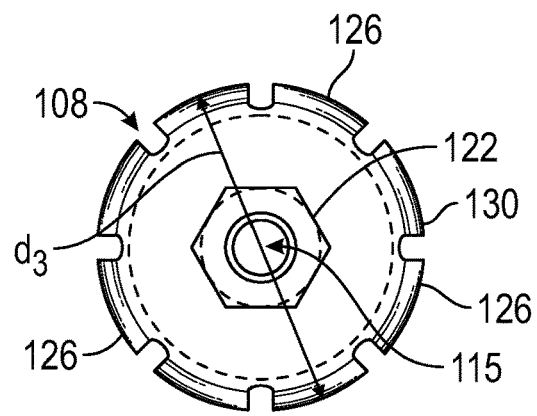
FIG. 6 is a top view of the wall anchor shown in FIG. 4, in a contracted position, in accordance with certain embodiments.

Referring now to FIGS. 4, 5 and 6, shown are top views of the anchor 108 to illustrate the changes in diameter of the top rim 130 during expansion and contraction of the crown 124 in response to forces applied to the crown elements 126, in accordance with embodiments. For example, FIG. 4 shows the crown 124 in a neutral or initial position, where the top rim 130 of the crown elements 126 has an initial diameter $d_1$. In FIG. 5, each of the crown elements 126 has been pushed or moved outwards radially, such that the diameter of the top surface 130 has been enlarged to a second diameter $d_2$ greater than the initial diameter $d_1$, thus placing the crown 124 in an expanded position. In FIG. 6, each of the crown elements 126 has been pressed or moved inwards, such that the diameter of the top surface 130 has been reduced to a third diameter $d_3$ smaller than the initial diameter $d_1$, thus placing the crown 124 in a contracted position.

In embodiments, the individual crown elements 126 move or deform in response to one or more forces applied to the crown 124 during installation of the anchor 108 into the wall panel 302. For example, in some embodiments, the crown elements 126 may be at least slightly compressed inwards towards the third diameter $d_3$ as the upper crown 124 passes through an opening 318 formed in the laminate outer cover 316 to receive the anchor 108. The compression of the crown elements 126 can be caused by, for example, selection of an opening size that is smaller than a diameter of the crown 124 (such as, e.g., the outer crown diameter $d_o$), such that the outwardly sloping crown elements 126 and/or the outwardly extending flange portion 132 are pressed inwards by the walls of the opening 318 as the crown 124 passes there through. In such cases, the reduced diameter $d_3$ may be substantially equal to, or less than, a diameter of the opening 318 that receives the crown 124. As another example, the crown elements 126 may be expanded toward the second diameter $d_2$ as a projection of the washer assembly 106 (see, e.g., projection 136 in FIG. 7) engages the crown elements 126 upon coupling the washer assembly 106 to the opening 318 in the wall panel 302, as described in more detail below. The expansion of the crown elements 126 can be caused by, for example, the size and shape of the washer projection as compared to the top rim 130. In such cases, the enlarged diameter $d_2$ may be substantially equal to or greater than a diameter of the washer projection inserted into the crown 124.

More specifically, in a preferred embodiment, the opening 318 is a substantially round hole cut from or drilled into the laminate cover 316 prior to installation of the fastener assembly 100. The opening 318 may have a characteristic diameter that is selected based on, or is determined by, a diameter of the anchor 108 and/or a diameter of the washer projection, as described in more detail below. In some embodiments, the characteristic diameter of the opening 318 is selected to be substantially equal to or greater than the inner crown diameter $d_i$ but smaller than the outer crown diameter $d_o$. As shown in FIG. 2, the outer diameter $d_o$ of the top rim 130 is at least slightly larger than the inner crown diameter $d_i$ due to the flange portion 132 extending out from the crown 124. Thus, making the opening 318 smaller than the outer crown diameter $d_o$ causes the crown elements 126 to be moved or pushed inward by the laminate cover which forms the sides of the opening 318, as the top rim 130 of the crown 124 is inserted into the opening 318 and until the flange portion 132 fits through the opening 318. Once the entire flange portion 132 passes through or clears the opening 318, the crown elements 126 move or spring back to their neutral positions, so that the outer diameter $d_o$ of the top rim 130 (e.g., initial diameter $d_1$) is restored. Thus, once fully inserted, the outer diameter of the crown 124 resides completely within the opening 318. In one exemplary embodiment, the outer diameter $d_o$ of the crown 124 is about 1.2 to 1.25 inches, while the inner diameter $d_i$ is about 1.1 to 1.15 inches.

As mentioned above, the crown elements 126 may also move in response to engaging with the washer assembly 106. As shown in FIGS. 1 and 7, the washer assembly 106 includes a main washer body 134 (also referred to herein as a "washer") with a projection 136 depending or extending down from an underside 138 of the washer 134. The washer assembly 106 is coupled to the wall panel 302 and the anchor 108 by inserting the projection 136 through the opening 318 until the underside 138 of the washer 134 approaches and preferably engages an exterior surface of the laminate cover 316, as shown in FIG. 3. The projection 136 has a beveled or inwardly sloping wall that is configured to engage with the anchor crown 124 (also referred to herein as a "mating portion" of the anchor 108), as the washer assembly 106 is inserted through the opening 318. As shown in FIG. 7, the beveled walls can extend from a cylindrical portion of the projection 136 that has a top diameter $d_t$ and is adjacent to the underside 138 of the washer 134. In embodiments, the top diameter $d_t$ is larger than the inner crown diameter $d_i$, but smaller than the outer crown diameter $d_o$. Thus, as the projection 136 is forced into the crown 124, the beveled walls of the projection 136 engage with and press against an inside of the top rim 130, such that the crown elements 126 are pushed in a radially outward direction, along the underside of the laminate cover 316, and the outer crown diameter $d_o$ is enlarged (e.g., to the second diameter $d_2$ shown in FIG. 5). The crown elements 126 keep moving outwards until the projection 136 is substantially inside the crown 124, or the top diameter $d_t$ is adjacent the top rim 130.

Once the washer 134 is inserted into the anchor crown 124, the crown elements 126 attached to the washer projection 136 as a ferrule. That is, the crown 124 exerts an inward pressure on the projection 136 as the crown elements 126 try to contract back to the initial position of the top rim 130 (e.g., initial diameter $d_1$ shown in FIG. 1). This pressure causes the crown elements 126 to deform around and grasp onto the projection 136, thus strengthening or securing the connection between the washer 134 and the anchor 108. At the same time, the cylindrical top of the projection 136 continues to exert an outward pressure on the crown elements 126, which maintains an expanded outer diameter of the crown 124 and thereby keeps the top rim 130 of the anchor crown 124 engaged with an underside of the laminate outer cover 316 adjacent to and surrounding the opening 318, as shown in FIG. 3. Such engagement of the crown 124 with the underside of the laminate cover 316 adjacent an outer rim of the opening 318, prevents the anchor 108 from being pulling out from the wall 302, or otherwise slipping back through the opening 318, thus securing the fastener assembly 100 to the wall panel 302.

In some embodiments, the characteristic diameter of the opening 318 is selected based on the top diameter $d_t$ of the washer projection 136. For example, the opening 318 may be substantially equal to or greater than the top diameter $d_t$ of the projection 136 in order to fit the washer projection 136 into the opening 318. In an embodiment, a kit of the present invention includes a boring device, such as a forester drill bit, dimensioned to be compatible with the washer dimensions.

Referring additionally to FIGS. 7-10, shown are various views of the washer assembly 106, in accordance with embodiments. The washer assembly 106 includes a compressible gasket 140 (e.g., an O-ring or other elastomer), shown in FIG. 1, configured to mate with a recess, an annular groove or channel 142, formed on the underside surface 138 of the washer 134, as shown in FIG. 8. The gasket 140 may be configured (e.g., sized and shaped) to fit within a depth of the recess or channel 142 using a compression fit connection or the like. In an alternate embodiment, the compressible gasket may be mated with at least a portion of the lower surface of the washer body, without the need for a recess or channel, such as with use of mating friction fit, molding or adhesive. The compressible gasket 140 is further configured to engage with an outer surface of the laminate cover 316 once the washer assembly 106 is coupled to the wall panel 302 and compressed to form a seal, as shown in FIG. 3. In embodiments, the gasket 140 operates to create a secure engagement or seal between the underside surface 138 of the washer assembly 106 and the outer surface of the laminate cover 316. This seal may be substantially waterproof and dustproof, thus further enhancing the suitability of the fastener assembly 100 for highly clean environments.

The washer assembly 106 further includes a thin, compressible washer or disk 144 configured to reside between the washer 134 and the spacer 104. As shown in FIG. 7, a top surface 145 of the washer 134 includes a mating surface, preferably of a flat groove, recess, or channel 146, configured (e.g., sized and shaped) to receive the compressible washer 144 and the spacer 104 therein. The recess or flat groove 146 may have an outer upstanding wall with a height that is selected in order to accommodate the compressible washer 144 as well as a bottom portion of the spacer 104. Placing the spacer 104 into the flat groove 146 of the washer 134 and inserting the compressible washer 144 therebetween can prevent slippage and create a tight, secure seal between the spacer 104 and the washer 134.

In one alternative embodiment, the spacer 104 is fixedly attached to the washer 134, such that the spacer 104 and washer 134 form a single unit. In another alternative embodiment, the fastener assembly 100 does not include the spacer 104. Instead, the strut member 308 is attached directly to the washer assembly 106 using the elongated fastener 102.

In some embodiments, the spacer 104 and/or the washer assembly 106 can be made in various sizes to accommodate different types of installations or use cases. For example, the spacer 104 may be made available in different widths and/or lengths, and the washer 134 may be made available in different diameters.

Figure 14:
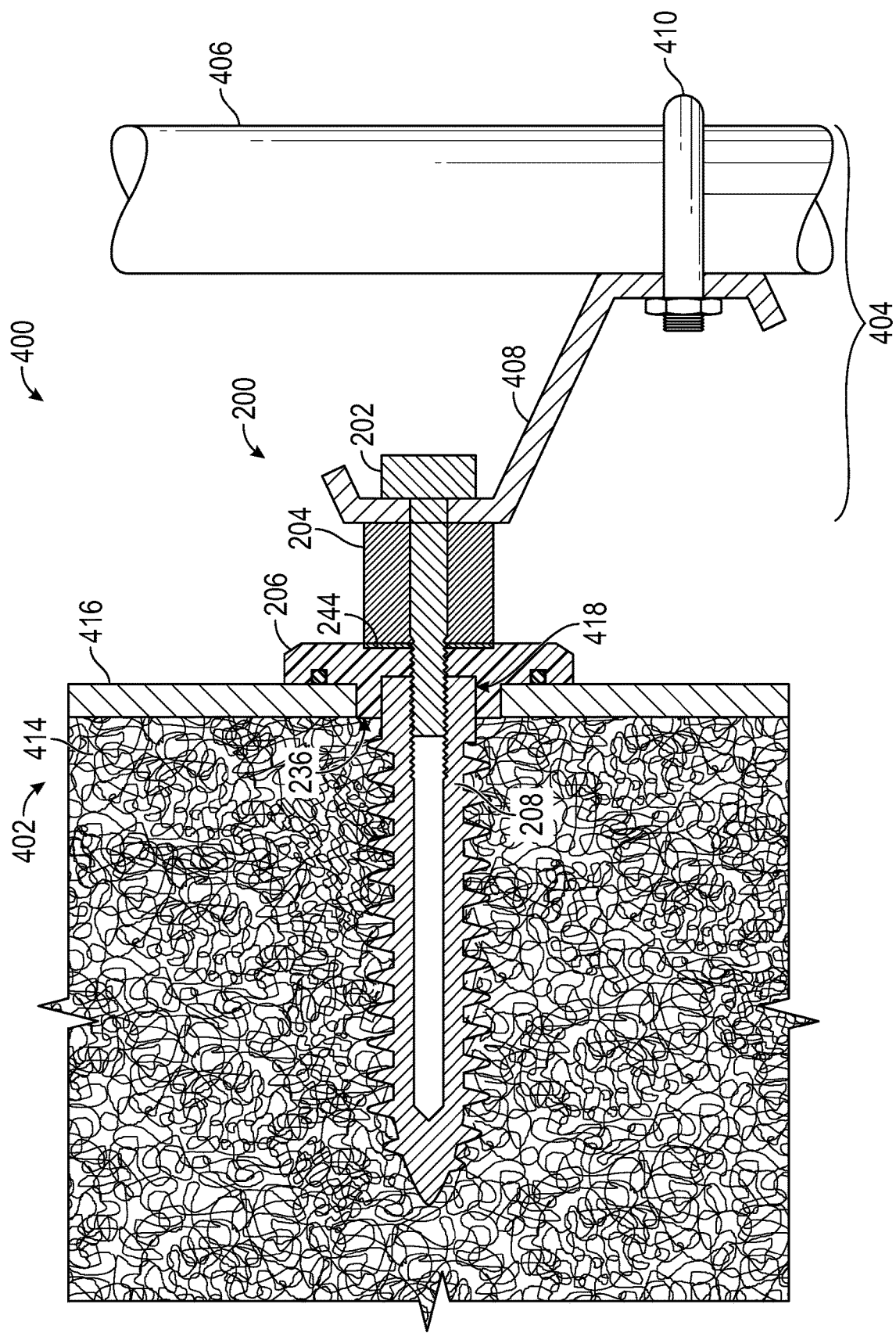
FIG. 14 is a cross-sectional side view of an exemplary wall mounting assembly attached to a wall panel, the wall mounting assembly including the fastener assembly of FIG. 12 and an exemplary mounting bracket or strut assembly, in accordance with certain embodiments.

FIGS. 12-14 illustrate another exemplary fastener assembly 200, in accordance with embodiments. The fastener assembly 200 is at least somewhat similar to the fastener assembly 100 shown in FIG. 1, though not having an upper crown of the anchor and mating projection of the washer assembly. For example, as shown in FIG. 12, the fastener assembly 200 includes an elongated fastener 202, a spacer 204, and a washer assembly 206 comprising a main washer body 234, a compressible gasket 240 for forming a seal with a wall panel, and a thin, compressible washer 244 for coupling between the washer 234 and the spacer 204, all of which is substantially similar to the corresponding components of the fastener assembly 100.

The fastener assembly 200 also includes an anchor 208 with an outer wall 217 having a generally helical arrangement 218 projecting radially outwards along an extent of the wall 217, similar to the anchor 108 shown in FIG. 1. As shown in FIG. 13, the anchor 208 also includes a central passageway 214 comprising a threaded surface 219 for securely receiving the fastener 208 within the anchor 208 through an open end 215, and a pointed bottom end 220 opposite a drive head 222 at a top end of the anchor 208.

FIG. 14 shows a wall mounting assembly 400 coupled to a wall panel 402, in accordance with embodiments. The wall panel 402 includes a thickness 414 of compressible material (e.g., foam) and a thin laminate cover 416 (e.g., stainless steel cladding). The wall mounting assembly 400 includes the fastener assembly 200 and a strut assembly 404 configured to carry a pipe, conduit, or tube, like the strut assembly 304. The strut assembly 404 is coupled to the wall panel 402 using the fastener assembly 200.

As shown, the anchor 208 is configured for insertion into the compressible material 414 of the wall panel 402. Like the anchor 108, the threaded arrangement 218 of the anchor 208 is configured to engage with and grip the compressible material 414, thus prevent slippage or movement once installed within the wall 402.

The fastener 202 is configured to secure all of the separate components—strut member 408, spacer 204, washer assembly 206, and anchor 208—together and to the wall panel 402, as shown in FIG. 4. In embodiments, an opening or hole 418 is formed in the wall panel 402 to receive the anchor 208 and an extent of the washer 234. The washer 234 includes a projection 236 with an open cavity for receiving an extent of the anchor drive head 222 upon coupling the washer 234 to the wall panel 402, as shown in FIG. 14. The opening 418 may be configured (e.g., sized and shaped) to receive the washer projection 236. A flange portion of the washer 234 engages an outer surface of the wall panel 402 and includes a compressible gasket 240 (e.g., O-ring) for creating a tight seal between the washer 234 and the laminate cover 416. The spacer 204 and a compressible washer 244 are coupled to a flat groove on a top surface of the washer 234, opposite the gasket 240. The spacer 204 is coupled to a strut member 408 using the fastener 202.

Figure 15:
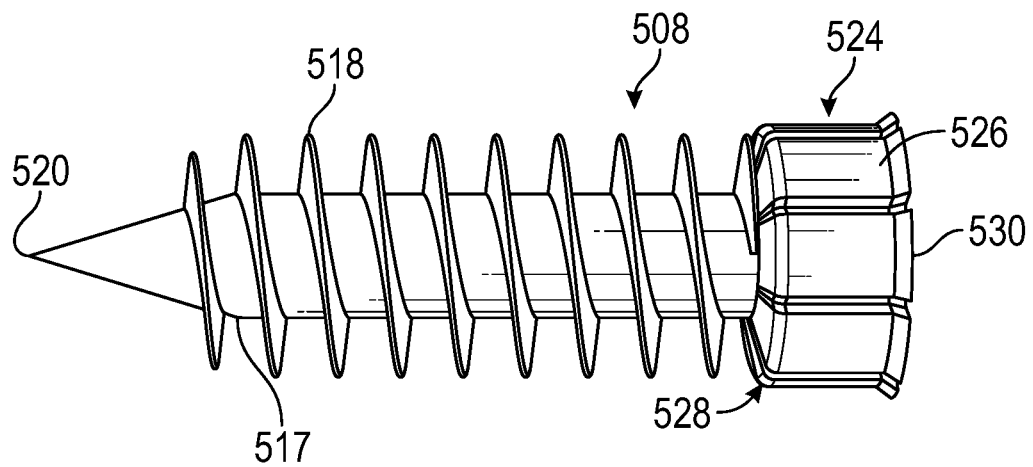
FIG. 15 is a side view of an exemplary wall anchor in accoring with certain embodiments.
Figure 16:
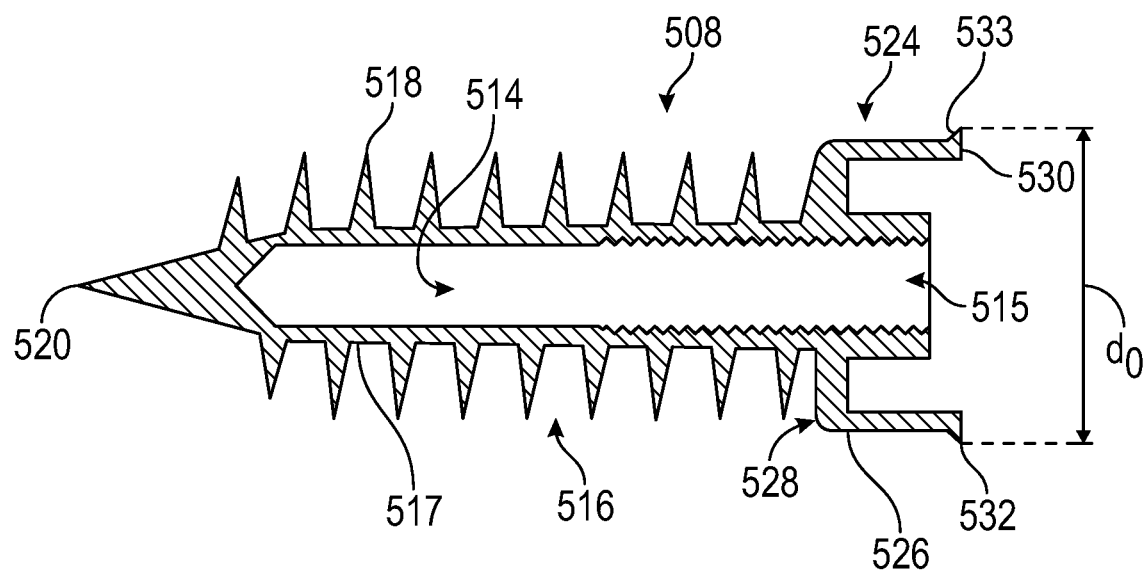
FIG. 16. is a cross-sectional view of the wall anchor shown in FIG. 15, in accordance with embodiments.

FIG. 15 illustrates an exemplary wall anchor 508 in accordance with certain embodiments. FIG. 16 illustrates a cross-sectional view of the wall anchor 508. As shown, the wall anchor 508 is similar to the wall anchor 108 shown in FIGS. 1 and 2. For example, like the wall anchor 108, the wall anchor 508 has an elongated body 516 comprised of an outer wall 517 and helical threads 518 extending radially outward along an extent of the outer wall 517. The anchor 508 further includes a hollow center, or central passageway 514, formed within and extending substantially through an extent of the elongated body 516. The helical threads 518 are formed by wide, substantially flat walls with thin, sharp edges that spiral around the outer wall 517 of the anchor 508 and create a progressive profile starting from the bottom, adjacent a distal end 520 of the wall anchor 508 and ending at the top of the threads. Also like the wall anchor 108, the wall anchor 508 includes an upper crown 524 that has a generally annular shape and is arranged about an open end 515 of the central passageway 514. The upper crown 524 comprises a plurality of circumferentially spaced wall elements 526 that cooperate to form an outer crown diameter $d_o$, the top end of each wall element 526 forming a top rim 530 with a flange portion 532 extending out from the rest of the wall element 526 in a substantially perpendicular direction.

The wall anchor 508 differs from the wall anchor 108 in that (1) the end 520 of the wall anchor 508 has a pilot tip that is more pointed and elongated than the end 120 of the wall anchor 108 shown in FIGS. 1 and 2, and (2) the crown elements 526 of the wall anchor 508 extend upward from a base portion 528 of the crown 524 in a substantially straight manner, unlike the outwardly sloping crown walls 126 of the wall anchor 108 shown in FIGS. 1 and 2.

More specifically, the pilot tip end 520 of the wall anchor 508 preferably has an elongated tapered or conical shape which is longer and more pointed or sharper that other embodiments, dimensioned to provide a pilot end to bore a straight path through compressible material of a support wall (e.g., wall 302 shown in FIG. 3) during installation. For example, a length of the conical end 520 and a slope of the walls that form the conical end 520 may be selected to better facilitate boring or piercing through the compressible material and thereby serve as a pilot to guide straight insertion of the anchor. In one exemplary embodiment, the conical end 520 has a length of about 0.5 to 1 inch (e.g., approximately 0.85 inch), while the remainder of the elongated body 516, or the extent carrying the helical threads 518, has a length of about 1.8 to 2.5 inches (e.g., approximately 2 inches), and the crown 524 has a length of about 0.5 to 0.75 inch (e.g., approximately 0.56 inch).

In some embodiments, a sloping profile of the conical end 520 mates with, or is a continuation of, a sloping profile of the helical threads 518. For example, the sloping profile may be aligned with a progressive width of the threading 518 so the elongated anchor body 516 has an extent that progressively narrows or tapers from top to bottom. In other embodiments, only a lower portion of the thread profile may be tapered to mate with the sloping profile of the conical end 520, for example, as shown in FIGS. 15 and 16. According to embodiments, the progressive profile of the anchor 508, coupled with the overall length of the anchor 508, and the use of a sturdy, lightweight material to manufacture the anchor 508, enables the anchor 508 to be forced into compressible material of a support wall (e.g., wall 302 shown in FIG. 3) with a modest and controlled amount of force, and guided by the pilot tip to pass generally straight along a generally linear path, thus avoiding excessive tearing of the compressible material or wandering off the intended path of insertion.

FIGS. 15 and 16 also show an embodiment of the upper crown whereby the crown elements 526 have substantially straight or upright walls, except for the flange or protruding lip 532 of the terminal end, i.e., the top rim 530. The top rim 530 extends out from the rest of the crown element 526 in a substantially perpendicular direction. The flange portion 532 is formed by a sidewall 533 that slopes outwards, or extends radially, from the crown element 526, and ends at the top rim 530. The upper crown 524 may otherwise operate in a substantially similar manner as the crown 124 described above and shown in FIGS. 1 and 2. For example, as shown in FIG. 16, the top rim 530 of the crown elements 526 may have an outer diameter $d_o$ formed by the outer edges of the flange portions 532. An opening in a support wall (e.g., opening 318 shown in FIG. 3) may have a diameter that is smaller than at least the outer diameter $d_o$. Thus, as the crown 524 passes through the wall opening, at least a portion of each crown element 526, including the sloped sidewall 533, may be compressed inwards until the top rim 530 clears the wall opening. Further, the crown elements 526 may be expanded or pressed outwards upon insertion of a washer (e.g., washer 134 shown in FIG. 1) into the crown 524, as described above.

Figure 17:
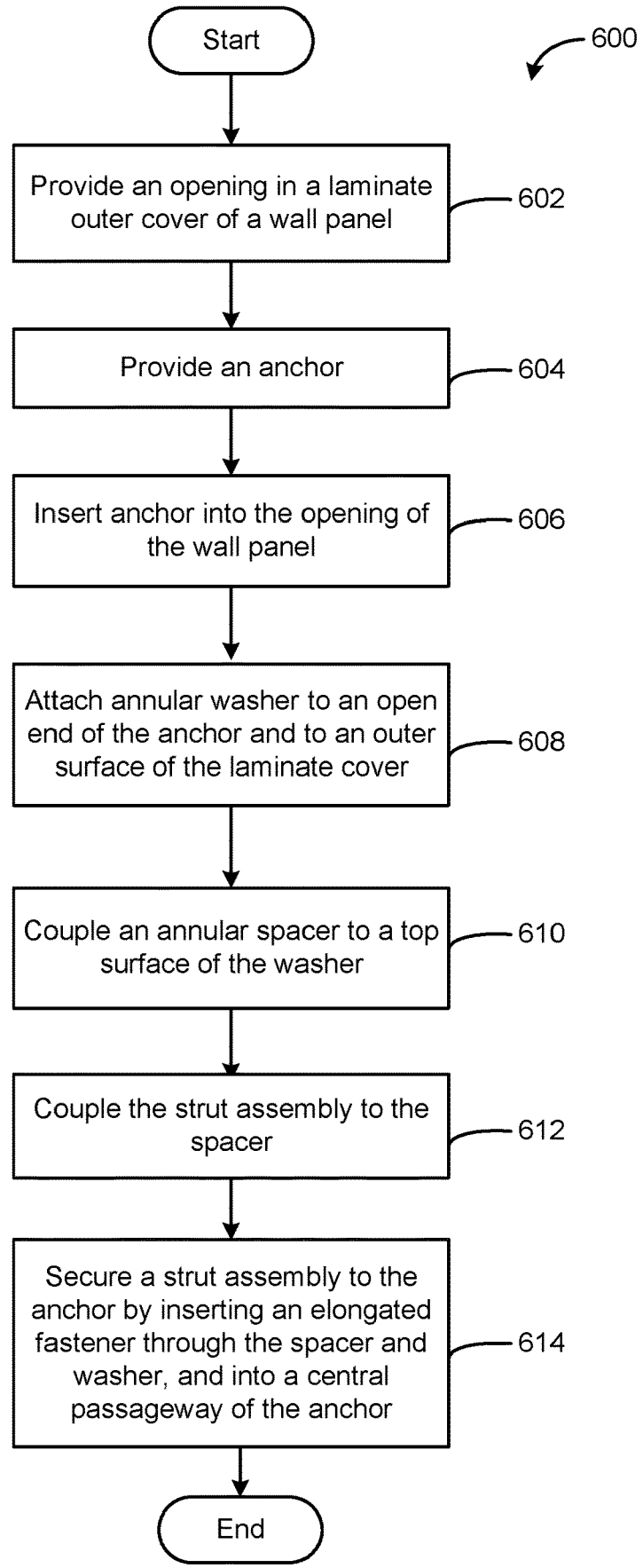
FIG. 17 is flow diagram for a method of mounting a supported element to a wall structure, in accordance with certain embodiments.

FIG. 17 illustrates an exemplary method 600 of mounting a supported element to a wall structure having a laminate outer cover and thickness comprised of compressible material, in accordance with embodiments. As an example, the method 600 may be used to mount a strut assembly coupled to a pipe, conduit, or tube (e.g., strut assembly 304 shown in FIG. 3) to a laminate foam wall panel (e.g., wall panel 302 shown in FIG. 3) using a fastener assembly (e.g., fastener assembly 100 shown in FIG. 1).

As shown, the method 600 may begin at step 602 with providing an opening (e.g., opening 318 shown in FIG. 3) in a laminate outer cover of the wall structure, the opening having a characteristic diameter. The characteristic diameter may be selected based on one or more attributes of the fastener assembly, such as, for example, a diameter associated with a washer projection (e.g., projection 136 shown in FIG. 7) and/or a diameter associated with an anchor crown (e.g., crown 124 shown in FIG. 1). Thus, in some embodiments, the step of providing an opening in the laminate cover includes forming a hole in the laminate cover sized to receive at least one of the mating portion (e.g., crown 124) of the anchor or the washer projection. The opening may be pre-drilled or may be created during installation of the mounting assembly.

At step 604, an anchor (e.g., anchor 108 shown in FIG. 1) having a generally cylindrical elongated body with a central passageway (e.g., passageway 114 shown in FIG. 2) and an open end (e.g., open end 115 shown in FIG. 2) is provided. The anchor body (e.g., elongated body 116) has a sidewall (e.g., outer wall 117 shown in FIG. 1) with a generally helical arrangement (e.g., threads 118 shown in FIG. 1) projecting radially outward along an extent of the sidewall. In embodiments, the generally helical arrangement of radially outward projections forms an outer threading (e.g., as shown in FIG. 1) for gripping or engaging with the compressible material of the wall panel.

At step 606, the anchor is inserted into the opening of the laminate cover to secure the anchor to the wall structure. This step can include threading the anchor into the wall structure by turning the anchor body to force an extent of the anchor body into compressible material of the wall structure. In some embodiments, the anchor includes an upper crown (e.g., crown 124 shown in FIG. 2) arranged about the open end of the central passageway and comprising a plurality of circumferentially spaced elements (e.g., crown elements 126 shown in FIG. 1) cooperating to form an outer crown diameter (e.g., diameter $d_o$ shown in FIG. 2). In such cases, the step of inserting said anchor into the wall structure includes causing the crown elements to deform radially inward and reduce the outer crown diameter (e.g., to the contracted diameter $d_3$ shown in FIG. 6) as the upper crown passes through the opening, and spring back to the outer diameter once the upper crown clears the opening. Once inside the wall panel, a top rim (e.g., top rim 130) of the anchor crown is positioned against an underside of the laminate cover.

At step 608, an annular washer (e.g., washer assembly 106 shown in FIG. 1) is attached to the open end of the anchor and against an outer surface of the laminate cover of the wall structure. In embodiments, attaching the annular washer includes inserting a projection (e.g., washer projection 136 shown in FIG. 7) depending from the washer into a mating portion of the anchor. The mating portion of the anchor can include the upper crown (e.g., crown 124 shown in FIG. 2). Attaching the washer can further include the steps of engaging said washer projection with said crown elements, and forcing the projection against the crown elements to enlarge the outer crown diameter (e.g., expanded diameter $d_2$ shown in FIG. 5). According to some embodiments, the step of forcing the projection against the crown elements can include causing an extent of the upper crown to move radially outward and into a position adjacent to an underside of the laminate cover of the wall structure (e.g., as shown in FIG. 3). For example, the crown elements may be pushed into an expanded position by the washer projection, such that the crown elements are arranged around or outside a perimeter of the opening.

At step 610, after at least partially securing the anchor to the wall structure, an annular spacer (e.g., spacer 104 shown in FIG. 1) is coupled to a top surface of the washer (e.g., top surface 145 shown in FIG. 11). For example, the spacer may be inserted into a flat groove (e.g., groove 146 shown in FIG. 11) on the top surface of the washer, the groove being configured to receive an extent of the spacer. In some embodiments, coupling the spacer also includes placing a thin, compressible washer (e.g., thin washer 144 shown in FIG. 11) into the flat groove before attaching the spacer, in order to more securely engage the spacer to the washer.

At step 612, a strut assembly (e.g., strut assembly 304 shown in FIG. 3) is coupled to the spacer, or placed against the spacer, opposite the washer assembly. At step 614, the strut assembly is secured to the anchor by inserting an elongated fastener into said passageway of the anchor to mechanically secure the strut assembly into place adjacent the wall structure. In embodiments, securing said strut assembly includes inserting the elongated fastener through the spacer and the washer and securely fastening a threaded arrangement of the fastener within the central passageway of the anchor to mechanically secure the spacer, washer, and anchor together as an assembly. The method 600 may end once the strut assembly is secured to the wall panel.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

The invention claimed is:

1. A mounting assembly for securing a supported element to a wall structure having a laminate outer cover residing adjacent to an internal thickness comprised of compressible material, the assembly comprising:
   an anchor configured to engage the wall structure, the anchor comprising a closed pointed end, a threaded outer wall for securing the anchor within the thickness of the wall structure, an elongated internal passageway having a closed end and an open end, said open end being configured to receive an extent of an elongated fastener, and a deformable upper crown arranged about said open end, wherein a length of said anchor is configured to enable an extent of the threaded outer wall to be forced into the compressible material of the wall structure;
   a washer with a projection configured to engage with the upper crown; and
   a strut assembly coupled to the supported element,
   wherein the elongated fastener is configured to penetrate the washer such that an outer diameter of the upper crown is enlarged upon coupling the projection to the upper crown, and the strut assembly is secured to the anchor and the wall structure.

2. The mounting assembly of claim 1, wherein the threaded outer wall of the anchor comprises a generally helical arrangement of projections extending radially outward along an extent of the outer wall.

3. The mounting assembly of claim 2, wherein the pointed end of the anchor is an elongated pilot tip comprised of a generally conical shaped length of the anchor which terminates at a pointed tip.

4. The mounting assembly of claim 2, wherein the helical arrangement of projections include course threading configured to grip the compressible material of the wall structure.

5. The mounting assembly of claim 1, wherein the outer diameter of the upper crown is configured to mate with an opening formed in the laminate cover for receiving the anchor.

6. The mounting assembly of claim 5, wherein the upper crown comprises a plurality of circumferentially spaced elements cooperating to form the outer diameter of the upper crown.

7. The mounting assembly of claim 1, wherein the enlarged outer diameter comprises an outwardly forced extent of the upper crown.

8. The mounting assembly of claim 5, wherein a top surface of said upper crown is configured to engage an underside of the laminate cover adjacent the opening.

9. The mounting assembly of claim 1, wherein an outer portion of the washer is configured for attachment to an outer surface of the laminate cover of the wall structure, the washer having an open center for receiving the elongated fastener.

10. The mounting assembly of claim 9, further comprising a spacer body coupled to the outer portion of the washer, the spacer body having a length extending out from the washer to provide a mounting surface for the strut assembly.

11. The mounting assembly of claim 10, wherein the washer includes a top groove configured to receive the spacer body.

12. A fastener assembly kit for securing a strut member to a laminated foam wall panel, the kit comprising:
   a plurality of separate components configured to be assembled together to mount the strut member to the wall panel, the components including an anchor for engaging the wall panel, a washer assembly for coupling to the anchor and the wall panel, a spacer for attachment to the washer assembly and the strut member, and an elongated fastener for securing the components to the wall panel,
   wherein the strut member provides a surface for securing a pipe, tube, or conduit; and
   wherein the anchor has a closed pointed end, and an inner passageway with a closed end and an open end, the open end configured to receive an extent of said fastener,
   said anchor having an upper crown arranged about said open end, said upper crown comprising a plurality of spaced elements cooperating to form an outer crown diameter, and said washer assembly having a washer with a projection body configured to force against said spaced elements of the crown to increase said outer crown diameter, and wherein the fastener assembly is configured for securely fastening the strut member to the wall panel, with at least a portion of the anchor threaded for forced insertion into a thickness of the wall panel and the upper crown of the anchor configured to engage with a laminated cover of the wall panel.

13. The kit of claim 12, wherein the spacer has a generally curved surface configured to minimize collection of dust when secured to the wall panel for use.

14. The kit of claim 12, wherein the washer assembly further comprises a compressible gasket configured to mate with a surface of the washer and to engage with a surface of the wall panel.

15. The kit of claim 12, wherein the washer assembly further comprises a compressible washer configured to reside between the washer and the spacer.

16. A fastener assembly for securing a supported element to a wall panel having an outer laminate cover and an internal thickness comprised of compressible material, the fastener assembly comprising:
   an internal portion comprising an anchor configured to engage the wall panel, the anchor comprising:
      a threaded outer wall and a closed pointed end configured to cut into the thickness of the wall panel, and secure the anchor therein,
      an elongated internal passageway having a closed end and an open end, the open end being configured to receive an extent of an elongated fastener, and
      a deformable mating portion arranged about said open end; and
   an external portion configured to engage an outer surface of the laminate cover and to engage with the mating portion of the anchor, the external portion comprising:
      a beveled surface configured to project into the wall panel and engage an extent of the mating portion such that an outer diameter of the mating portion is enlarged upon inserting the beveled surface into the mating portion, and
      an open center configured to receive the elongated fastener; and
   the elongated fastener configured to secure the external portion to the wall panel and the internal portion coupled therein.

17. The fastener assembly of claim 16, wherein a top surface of the mating portion is configured to engage an underside of the laminate cover of the wall panel upon insertion of the anchor into the wall panel.

18. The fastener assembly of claim 17, wherein the mating portion is configured to be pressed inwards, such that the outer diameter is reduced, during insertion of the mating portion into the wall panel, and to spring back to the outer diameter once the mating portion is fully positioned within the wall panel.

19. The fastener assembly of claim 18, wherein the mating portion is formed by a plurality of circumferentially spaced elements cooperating to form the outer diameter, each element being individually movable to change the outer diameter.

20. The fastener assembly of claim 19, wherein the spaced elements are configured to form a crown around the open end, the spaced elements extending from a base portion of the crown.

21. The fastener assembly of claim 16, wherein the elongated internal passageway of the anchor includes a threaded surface for securing the elongated fastener to the anchor.

22. The fastener assembly of claim 16, wherein the beveled surface is a portion of a washer assembly configured for engagement to the wall panel, and the external portion further comprises a spacer configured for engagement to the washer assembly.

23. The fastener assembly of claim 22, wherein the external portion further comprises a strut member coupled to the supported element.

24. The fastener assembly of claim 16, wherein the threaded outer wall of the anchor comprises helical threads extending radially outward along an extent of the outer wall.

25. The fastener assembly of claim 24, wherein the anchor has a length configured to enable the extent of the outer wall to be forced into and through the compressible material of the wall panel.

26. The fastener assembly of claim 16, wherein the pointed end of the anchor is formed by a generally conical shaped length of the anchor terminating at a pointed tip.

27. The fastener assembly of claim 16, wherein the beveled surface has a top diameter that is greater than an inner diameter of the mating portion and less than the outer diameter of the mating portion, the beveled surface further having a bottom diameter that is less than the top diameter.

* * * * *